US00RE41398E

(19) United States
(12) Reissued Patent
May et al.

(10) Patent Number: US RE41,398 E
(45) Date of Reissued Patent: Jun. 29, 2010

(54) DESIGN OF VISCOELASTIC COATINGS TO REDUCE TURBULENT FRICTION DRAG

(75) Inventors: Carol L. May, Falls Church, VA (US); Gennadiy A. Voropayev, Kiev (UA)

(73) Assignee: Cortana Corporation, Falls Church, VA (US)

(21) Appl. No.: 11/054,719

(22) Filed: Feb. 10, 2005

Related U.S. Patent Documents

Reissue of:
(64) Patent No.: 6,516,652
Issued: Feb. 11, 2003
Appl. No.: 09/546,380
Filed: Apr. 10, 2000

(51) Int. Cl.
*G01N 19/02* (2006.01)
*G01N 3/56* (2006.01)

(52) U.S. Cl. ..... 73/10
(58) Field of Classification Search ..... 73/819, 73/10; 244/200; 137/13
See application file for complete search history.

(56) References Cited

U.S. PATENT DOCUMENTS

| | | | | | |
|---|---|---|---|---|---|
| 3,435,796 | A | * | 4/1969 | Merrill | 114/67 R |
| 3,516,376 | A | * | 6/1970 | Kowalski | 114/67 R |
| 4,771,799 | A | * | 9/1988 | Baxter et al. | 137/13 |
| 4,865,271 | A | * | 9/1989 | Savill | 244/130 |
| 4,932,612 | A | * | 6/1990 | Blackwelder et al. | 244/207 |
| 5,020,561 | A | | 6/1991 | Li | |
| 5,133,519 | A | | 7/1992 | Falco | |
| 5,342,465 | A | * | 8/1994 | Bronowicki et al. | 156/175 |
| 5,619,433 | A | | 4/1997 | Wang et al. | |
| 6,024,119 | A | * | 2/2000 | Kirschner | 137/487.5 |
| 6,287,664 | B1 | * | 9/2001 | Pratt | 428/68 |
| 6,332,593 | B1 | * | 12/2001 | Kamiadakis et al. | 244/204 |
| 6,357,374 | B1 | * | 3/2002 | Moore et al. | 114/67 A |
| 6,892,989 | B1 | * | 5/2005 | Whitmore et al. | 244/200 |
| 2002/0173569 | A1 | * | 11/2002 | Karhu et al. | 524/313 |
| 2005/0032029 | A1 | * | 2/2005 | Trunk | 434/300 |

OTHER PUBLICATIONS

P.A. Davidson, *Turbulence—An Introduction for Scientists and Engineers*, 2004, pp. 130 and 131, Oxford University Press, New York.

A.D. Young, *Boundary Layers*, 1989, p. 12, AIAA Education Series, Washington, DC.

* cited by examiner

*Primary Examiner*—Lisa M. Caputo
*Assistant Examiner*—Octavia Davis
(74) *Attorney, Agent, or Firm*—Arnold International; Bruce Y. Arnold

(57) ABSTRACT

A method is provided to select appropriate material properties for turbulent friction drag reduction, given a specific body configuration and freestream velocity. The method is based on a mathematical description of the balance of energy at the interface between the viscoelastic surface and the moving fluid, and permits determination of the interaction of turbulent boundary layer fluctuations with a viscoelastic layer by solving two subtasks—i.e., a hydrodynamic problem and an elasticity problem, which are coupled by absorption and compliancy coefficients. Displacement, velocity, and energy transfer boundary conditions on a viscoelastic surface are determined, and a Reynolds stress type turbulence model is modified to account for redistribution of turbulent energy in the near-wall region of the boundary layer. The invention permits drag reduction by a coating with specified density, thickness, and complex shear modulus to be predicted for a given body geometry and freestream velocity. For practical applications, viscoelastic coatings may be combined with additional structure, including underlying wedges to minimize edge effects for coatings of finite length, and surface riblets, for stabilization of longitudinal vortices.

25 Claims, 3 Drawing Sheets

DESIGN OF VISCOELASTIC COATINGS TO REDUCE TURBULENT FRICTION DRAG

Matter enclosed in heavy brackets [ ] appears in the original patent but forms no part of this reissue specification; matter printed in italics indicates the additions made by reissue.

[This application claims the benefit of No. 60/138,023, filed Jun. 8, 1999.]

BACKGROUND OF INVENTION

Since M. O. Kramer reported successful experimental results in 1957, there have been repeated attempts to reduce frictional drag in turbulent fluid flow over a surface by applying a passive compliant coating. Experimental results in this area have been mixed. Most investigators have reported a drag increase, while only a few have claimed drag reduction for turbulent flow. A number of theoretical studies have characterized the stability of the laminar boundary layer over a deforming surface and other studies have characterized the reaction of a coating to a fluctuating load. However, no rigorous analytical technique has been previously reported that has been used to successfully design a drag-reducing coating for turbulent flow.

In the past, passive coatings were tested without specification and full characterization of critical physical parameters, such as the frequency dependent complex shear modulus, density, and thickness. In order to achieve and ensure drag reduction with a viscoelastic coating, a methodology is required for selecting appropriate material properties and for estimating anticipated drag reduction as a function of configuration and velocity.

Relevant background information for associated technical topics is available in the literature, and may be useful due to the technical complexity of this invention. A classical discussion of boundary layer theory, including formulation of Navier-Stokes and turbulent boundary layer equations, is provided in Boundary-Layer Theory, by Dr. Hermann Schlichting, published by McGraw Hill, New York, seventh edition, 1979. A discussion of structures and scales in turbulent flows can be found in Turbulence, 1975, McGraw Hill, written by J. O. Hinze, and in "Coherent Motions in the Turbulent Boundary Layer," in Annual Review of Fluid Mechanics, 1991, volume 23, pp. 601–39, written by Steven K. Robinson. Background on Reynolds stress types of turbulence models is found in the chapter, "Turbulent Flows: Model Equations and Solution Methodology," written by Tom Gatski, and included in the Handbook of Computational Fluid Mechanics, published by Academic Press in 1996. Equations in fluid and solid mechanics are often expressed in indicial, or tensor, notation, for compactness. Chapter 2 in the text A First Course in Continuum Mechanics, by Y. C. Fung, Prentice-Hall, Inc., Englewood Cliffs, N.J., 1977, provides a brief introduction into tensor notation for mechanics equations. An introduction to finite difference methods, which are used to solve the system of momentum and continuity equations for a turbulent fluid, is provided in the text, Computational Fluid Dynamics for Engineers, written by Klaus Hoffman, and published in 1989 by the Engineering Education System [i Austin] *in Austin*, Texas. Descriptions of measured and mathematically modeled physical properties of polymers are found in the text, Viscoelastic Properties of Polymers by J. D. Ferry, Wiley, New York, 1980, 3$^{rd}$ edition. The article, "Loss Factor Height and Width Limits for Polymer Relaxation," by Bruce Hartmann, Gilbert Lee, and John Lee, in the Journal of the Acoustical Society of America Vol. 95, No. 1, January 1994, discusses mathematical characterization of shear moduli for real viscoelastic, polymeric materials, including those approximated by the Havriliak-Negami approach.

Recently in the international literature (K. S. Choi, X. Yang, B. R. Clayton, E. J. Glover, M. Atlar, B. N. Semonev, and V. M. Kulik, "Turbulent Drag Reduction Using Compliant Surfaces," Proceedings of the Royal Society of London, A (1997) 453, pp. 2229–2240). Choi et al. reported experimental measurements of up to 7% turbulent friction drag reduction for an axisymmetric body coated with a viscoelastic material. These experiments were performed in the United Kingdom, using coatings designed and fabricated in Russia at the Institute of Thermophysics, Russian Academy of Sciences, Novosibirsk, by a team headed by B .N. Semenov. The basic design approach was outlined in "On Conditions of Modelling and Choice of Viscoelastic Coatings for Drag Reduction," in Recent Developments in Turbulence Management, K. S. Choi, ed., 1991, pp. 241–262, Dordrecht, Kluwer Publishers. The Novosibirsk design approach is semi-empirical in nature, and does not take into account the full characterization of the complex shear modulus of the viscoelastic material, namely, the relaxation time of the material. The Novosibirsk design approach does take into account frequency-dependent material properties. Furthermore, the Novosibirsk concept is valid only for a membrane-type coating, such as a film which coats a foam-rubber saturated with water or glycerine, and where only normal fluctuations of the surface are considered.

The structure of coatings intended for drag reduction has been addressed in the international literature, starting with the 1938 patent No. 669–897, "An Apparatus for the Reduction of Friction Drag," issued in Germany to Max O. Kramer. Kramer later received a patent in 1964, U.S. Pat. No. 3,161,385, and in 1971, U.S. Pat. No. 3,585,953 for coatings to extend laminar flow in a boundary layer. Soviet inventor's certificates, such as "A Damping Covering," USSR patent 1413286, Publication 20.01.1974, Bulletin of the Inventions 14, by V. V. Babenko, L. F. Kozlov, and S. V. Pershin, "An Adjustable Damping Covering," USSR patent 1597866, Publication 15.03.1978, Bulletin of the Inventions 110, by V. V. Babenko, L. F. Kozlov, and V. I. Korobov, and "A Damping Covering for Solid Bodies," USSR patent 1802672, Publication 07.02.1981, Bulletin of the Inventions 15, by V. V. Babenko and N. F. Yurchenko, have also described the structure of drag-reducing coatings comprised of viscoelastic materials. These inventor's certificates identified the three-dimensional structure within a drag-reducing coating, but do not address the methodology for choosing appropriate parameters of the viscoelastic materials to be used in the manufacture of such coatings. Structural features include multiple layers of materials, longitudinal, rib-like inclusions of elastic, viscoelastic, or fluid materials, and heated elements. Viscoelastic coatings may be combined with other forms of structure, such as longitudinal riblets molded on or within the surface of the coating. As described in the international literature in publications such as "Secondary Flow Induced by Riblets," written by D. B. Goldstein and T. C. Tuan, and published in the Journal of Fluid Mechanics, volume 363, May 25, 1998, pp. 115–152, two-dimensional, rigid riblets alone have been shown experimentally to reduce surface friction drag up to about 10%.

BRIEF SUMMARY OF THE INVENTION

The present invention enables the design of a passive viscoelastic coating for the reduction of turbulent friction drag. Coatings with material properties designed using the methodology described in this invention have reduced friction drag by greater than 10%. The methodology of the present invention permits, as a first object of the invention, the specification of the frequency dependent complex shear modulus, the density, and the thickness of an isotropic viscoelastic material which will reduce turbulent friction drag relative to specific flow conditions over a rigid surface. Quantitative levels of drag reduction can be estimated. Mathematical detail is provided for the cases of turbulent flow over a rigid flat plate as well as a viscoelastic flat plate, where the invention accounts for both normal and longitudinal oscillations of the surface. A second object of the invention is the specification of material properties for a coating composed of multiple layers of isotropic viscoelastic materials. A third object of the invention is the specification of material properties for a coating composed of an anisotropic material. A fourth object of the invention is the minimization of edge effects for coatings of finite length. A fifth object of the invention is the stabilization of longitudinal vortices through combination of viscoelastic coating design with additional structure, such as riblets.

The methodology used herein to describe the interaction of a turbulent boundary layer (TBL) with a viscoelastic (VE) layer involves two tasks, 1) a fluids task, involving the calculation of turbulent boundary layer parameters, given boundary conditions for a rigid, elastic, or viscoelastic surface (herein referred to as the TBL problem), and 2) a materials task, involving the calculation of the response of a viscoelastic or elastic surface to a periodic forcing function which approximates the loading of the turbulent boundary [layer. The invention focuses upon cation of amplitudes of] *layer. The invention focuses upon calculation of amplitudes of* surface oscillations and velocities, and of the energy flux for a viscoelastic coating (hereinafter referred to as the VE problem). These two tasks are coupled by coefficients related to surface boundary conditions of energy absorption and surface oscillation amplitudes (hereinafter referred to as dynamic and kinematic boundary conditions, respectively). The TBL problem is first solved for a rigid surface, thus providing necessary input to describe the forcing function on the surface, and also providing baseline calculations of friction drag, for comparison. The VE problem is solved next, given a periodic forcing function that approximates the shear and pressure pulsations of a given boundary layer. Initial choices for material parameters are based on theoretical and empirical guidelines. Optimal material parameters are chosen, following a series of iterations, such that the following two criteria are met:

1) the energy flux into the viscoelastic coating is maximum, and
2) the amplitudes of surface oscillation are less than the thickness of the viscous sublayer of the turbulent boundary layer over the coating.

If the amplitude of oscillations exceeds the thickness of the viscous sublayer of the turbulent flow, then the oscillations effectively increase the roughness of the surface, thus leading to an increase in friction drag. Furthermore, as the phase speed of disturbances in the boundary layer exceeds the shear wave speed in the material, a resonant interaction with large amplitude waves occurs. These conditions are to be avoided. Moderate energy flux into the material, however, where energy is transformed into internal shear waves and eventually dissipated as heat, leads to a qualitative and quantitative change in the turbulent energy balance, with a consequent reduction in friction drag. Optimal physical properties of a viscoelastic material will vary with freestream velocity, position along a body, pressure gradient, and any other factors which influence the development of the boundary layer and the characteristics of local turbulent fluctuations.

By solving the TBL equations, the turbulent friction drag over a viscoelastic, elastic, or rigid surface can be quantitatively evaluated. In the case of a viscoelastic surface, where energy is absorbed and surface oscillations are nonzero, both dynamic and kinematic boundary conditions are specified. These boundary conditions are derived directly from the solution of the VE equations for energy flux and surface oscillation amplitudes, and then transferred into a dissipation boundary condition and Reynolds stress boundary conditions for solution of the TBL equations. Vertical oscillations influence the effective roughness of the surface, and the root-mean square (rms) value of the vertical oscillation amplitude is classified as the dynamic roughness. If the oscillation amplitudes are lower than the viscous sublayer thickness, it is appropriate to estimate Reynolds stresses as zero. The equations for a turbulent boundary layer describe turbulent diffusion as a gradient approximation, which accommodates the dynamic boundary condition, and near-wall functions are introduced to describe for different surfaces the redistribution of turbulent energy in the near-wall region.

BRIEF DESCRIPTION OF THE DRAWINGS

The present invention will become more fully understood from the detailed description given below and the accompanying drawings, which are given by way of illustration only and thus are not limitative of the present invention, wherein.

DETAILED DESCRIPTION

The present invention identifies physical and geometric parameters of a viscoelastic coating that reduces turbulent friction drag under given flow conditions. Furthermore, the invention permits evaluation of the anticipated drag reduction effectiveness of a given material with known physical properties for a given body configuration and set of flow conditions. The methodology has been applied principally to the characterization of coatings for turbulent flow over flat plates and bodies of revolution, and can also be applied to more complex geometries having curvature and nonzero pressure gradients.

A fluid boundary layer is the very thin layer of fluid adjacent to a surface over which fluid is flowing. It is the region where frictional forces play a major role, and is where the flow adjusts from conditions at the surface to conditions in the freestream of the flow. The outer edge of the boundary layer is traditionally defined as that location where the ratio, $\beta$, of the mean velocity, U, to the freestream velocity, $U_{28}$, is a constant which is approximately equal to 1:

$$\frac{U}{U_\infty}\Big|_{\frac{y}{\delta}=1} = \beta \approx 1 \qquad \text{(Equation 1)}$$

The value of the constant, β, chosen will depend upon configuration and numerical stability concerns. For the case of a flat plate, an appropriate value for this constant is 0.9975.

A turbulent boundary layer is characterized by a spectrum of pressure and shear fluctuations, the frequency, phase speed, and amplitude characteristics of which are a function of such factors as freestream velocity, body configuration, surface conditions, and pressure gradient. With flow over a rigid surface, there is no motion of the surface. With an elastic or viscoelastic surface, the wall pressure and shear fluctuations act as a forcing function which can deform the surface, creating surface waves. With a viscoelastic surface, energy from the turbulent boundary layer may be absorbed and dissipated by the coating, thus necessitating proper specification of boundary conditions for both Reynolds stresses and energy absorption at the wall (i.e., kinematic and dynamic boundary conditions).

Figure 1A:
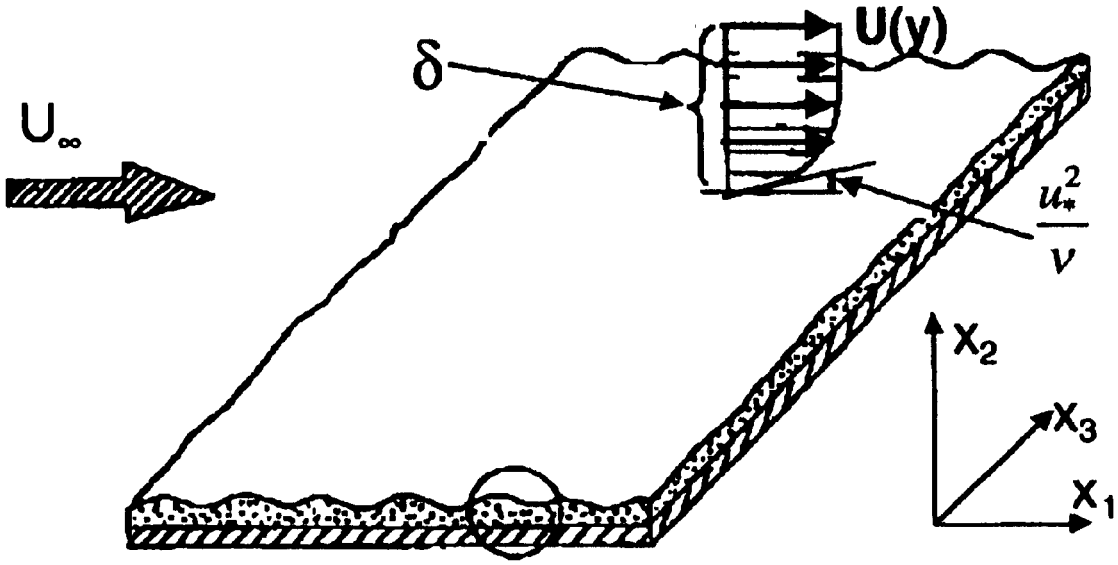
FIG. 1a is a schematic of the interaction of a passive viscoelastic surface with a turbulent boundary layer, where a low-amplitude traveling wave develops on the surface.
Figure 1B:
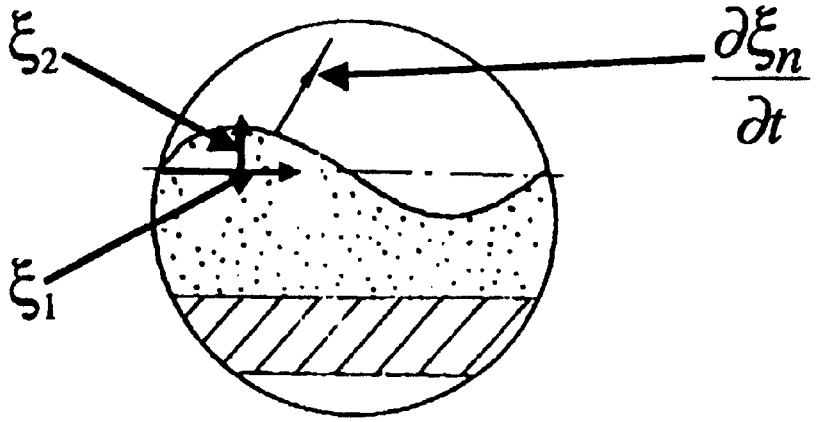
FIG. 1b is an enlargement of the region within the circle shown in FIG. 1a, and indicates displacement amplitudes.

FIG. 1 is a schematic of a passive viscoelastic coating that interacts with a turbulent boundary layer of thickness, δ. For simplicity, the case of a flow with a freestream velocity of $U_\infty$ over a coated flat plate is considered, where coordinates x, y, and z are in the longitudinal, normal, and transverse directions, respectively. Alternatively, x is represented as $x_1$, y as $x_2$, and z as $x_3$. It is assumed that the fluid is viscous and incompressible, and that the coating material is viscoelastic (i.e., possesses a combination of elastic and viscous physical properties). If the surface is rigid, there will be no oscillation or energy absorption. If the surface is elastic or viscoelastic, there will be surface oscillation and, if the surface is viscoelastic, there will be energy exchange as well. The components of longitudinal and vertical surface displacement of the viscoelastic material are given by $\xi_1$ and $\xi_2$, and the friction velocity is defined as:

$$u_* = \sqrt{\frac{\tau_w}{\rho}} \qquad \text{(Equation 2)}$$

where $\tau_w$ is the shear stress at the wall and ρ is the density of the fluid. The interaction of the turbulent flow with a viscoelastic coating leads to the formation of a quasi-periodic surface wave. The motion and energy absorption of the coating (kinematic and dynamic boundary conditions) in turn affect the energy balance in the turbulent boundary layer and the value of the friction drag, the latter of which is the surface integral of the wall shear stress.

Figure 2:
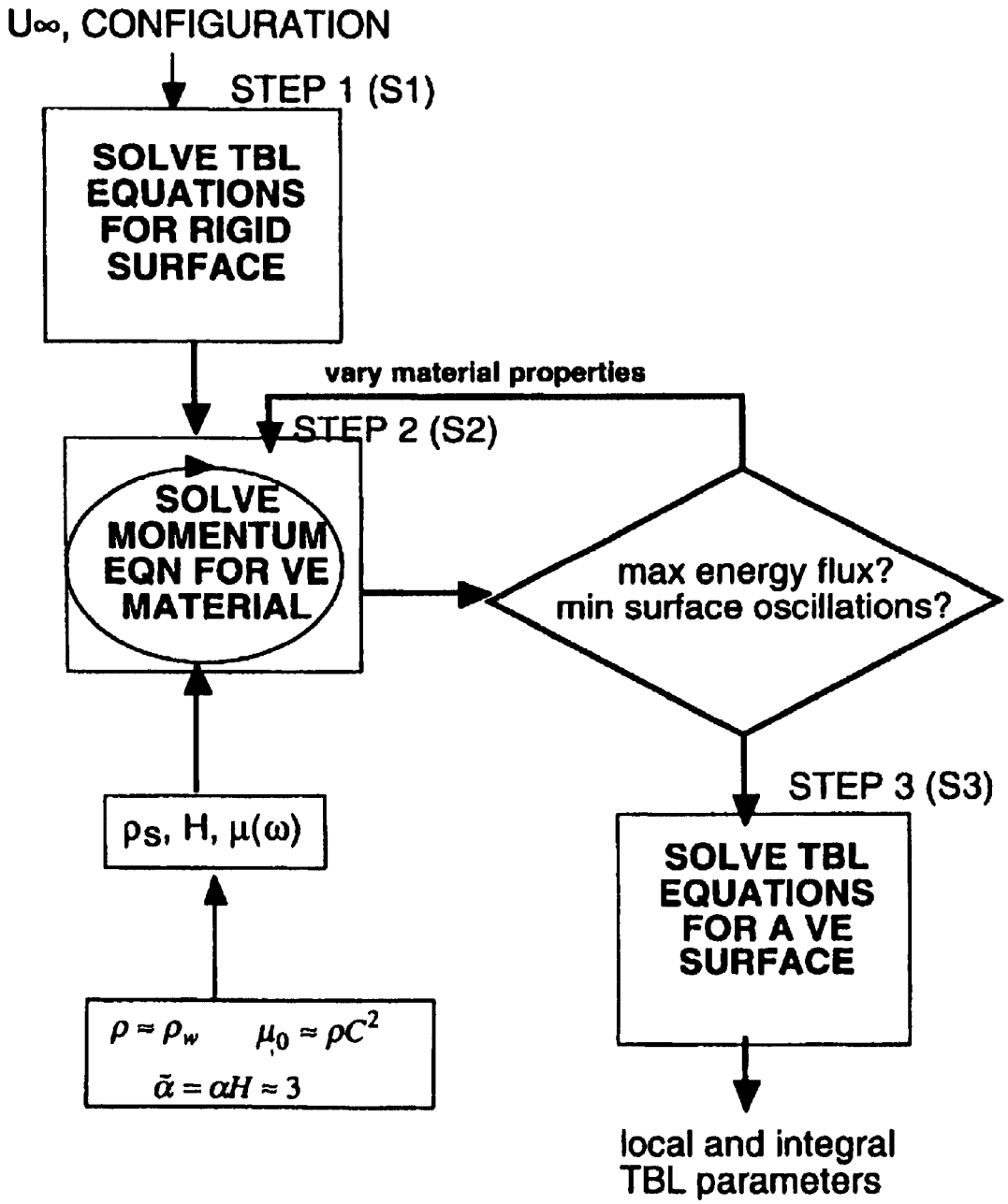
FIG. 2 is a flowchart of the basic methodology required to a) choose a viscoelastic material that reduces turbulent friction drag under given flow conditions, and b) to quantify the value of drag reduction relative to a rigid surface.

The methodology for this invention is schematically shown in FIG. 2. The present invention includes solutions for: 1) turbulent boundary layer (TBL) parameters, including friction drag over rigid, viscoelastic, or elastic plates; and, 2) energy absorption and oscillation amplitudes of a viscoelastic (VE) plate excited by a periodic load which approximates that of a turbulent boundary layer. These two [parts of the solution are coupled by boundary, conditions,] *parts of the solution are coupled by boundary conditions,* both for energy absorbed by the surface and for the amplitudes of surface motion, and are part of an overall methodology for selecting drag-reducing coatings and for quantifying drag reduction for given flow conditions. Below, the two parts of the solution, as well as the methodology that couples them, are described.

Characterization of a Turbulent Boundary Layer Over Rigid, Elastic, or Viscoelastic Surfaces (TBL Problem)

In FIG. 2, TBL parameters are first characterized for a rigid surface (step 1) and, once material properties are defined, for a viscoelastic material (step 3). The same basic approach is applied in step 3 as in step 1, except the kinematic and dynamic boundary conditions are defined differently. For a rigid surface, there is no surface motion and no energy absorption. For an elastic surface, there is surface motion, but no energy absorption. For a viscoelastic surface, there is surface motion and energy absorption.

General System of Equations of Continuity, Motion and Energy: Turbulent flow parameters are obtained through the solution of a system of equations of continuity, motion, and energy, with accompanying boundary conditions. These equations are developed from principles of conservation of mass, conservation of momentum (Newton's second law), and energy balance (as based on the first law of thermodynamics).

In Cartesian coordinates, the general equation of continuity for a compressible fluid having a density of ρ, and velocity components U, V, and W in the streamwise, normal, and transverse directions, is given by Equation 3, below.

$$\frac{\partial\rho}{\partial t} + \frac{\partial(\rho U)}{\partial x} + \frac{\partial(\rho V)}{\partial y} + \frac{\partial(\rho W)}{\partial z} = 0 \qquad \text{(Equation 3)}$$

Alternatively, Equation 3 can be written in terms of indicial notation (as in Equation 4), where x, y, and z are represented by $x_1$, $x_2$, and $x_3$, respectively, an where U, V, and W are represented by $U_1$, $U_2$, and $U_3$, respectively. It is implied that the index, i, can have a value of 1, 2, or 3, and that a repeated index of i indicates summation.

$$\frac{\partial\rho}{\partial t} + \frac{\partial(\rho U_i)}{\partial x_i} = 0 \qquad \text{(Equation 4)}$$

Equation (3) is further simplified for a fluid that is incompressible, i.e., where the density of the fluid is constant, the following applies:

$$\frac{\partial U_i}{\partial x_i} = 0 \qquad \text{(Equation 5)}$$

The generalized equations of motion, termed the Navier-Stokes equations, are expressed in Cartesian coordinates for the case of an incompressible fluid with constant viscosity as:

$$\frac{\partial U_i}{\partial t} + U_j\frac{\partial U_i}{\partial x_j} = -\frac{1}{\rho}\frac{\partial \mathcal{P}}{\partial x_i} + g_i + \nu\frac{\partial^2 U_i}{\partial x_j \partial x_j} \qquad \text{(Equations 6a-6b-6c)}$$

In Equations 6:

P is the mean pressure, $g_i$ is the body force vector, due to external fields, such as gravity, which act on the element, and ν is the kinematic viscosity (assumed to be constant).

Note that the above expression, written in indicial notation, actually represents three equations, for the three components of velocity in the x, y, and z directions.

Turbulent velocity components may be described as the sum of the mean and fluctuating components, $U_i$ and u', respectively, where $U_1$, $U_2$, and $U_3$, are equivalent to U, V, and W and where $u'_1$, $u'_2$, and $u'_3$ are equivalent to u', v', and w':

$$U_i = U_i + u_i \qquad \text{(Equations 7a-7b-7c)}$$

An overbar indicates time-averaging:

$$U_i = \overline{U}_i \qquad \text{(Equations 8a-8b-8c)}$$

Substituting Equations 7a–7c into Equations 6a–6c and time-averaging yields the following system of three complex nonlinear second-order partial differential equations of motion for turbulent flow:

$$U_j \frac{\partial U_i}{\partial x_j} = -\frac{1}{\rho}\frac{\partial \mathcal{P}}{\partial x_i} + g_i + \nu \frac{\partial^2 U_i}{\partial x_j \partial x_j} - \frac{\partial \overline{u_i' u_j'}}{\partial x_j} \qquad \text{(Equations 9a-9b-9c)}$$

In Equations 9a–9c, the components $\overline{u'^2}$, $\overline{v'^2}$, and $\overline{w'^2}$ are termed normal Reynolds stresses, and the components in the form $-\overline{u'v'}$, $-\overline{v'w'}$, and $-\overline{u'w'}$ are termed Reynolds shear stresses. The turbulent kinetic energy, k, is defined as:

$$k = \frac{1}{2}\left(\overline{u'^2} + \overline{v'^2} + \overline{w'^2}\right) \qquad \text{(Equation 10)}$$

Closure of the generalized system of equations including the continuity equation (Equation 5) and the equations of motion (Equations 9a–9c) for a turbulent flow requires seven additional equations to characterize the six Reynolds stresses, $\overline{u_i' u_j'}$, and the rate of transport of the turbulent kinetic energy, k. This invention solves for the isotropic dissipation rate, $\epsilon$, which is related to energy transport through the fluid and at the fluid-surface interface. The energy transport equation is based upon the first law of thermodynamics, where heat, dQ, added to a volume during an element of time, dt, serves to increase internal energy, dE, and to perform work, dWK.

$$\underbrace{\frac{dQ}{dt}}_{\text{heat}} = \underbrace{\frac{dE}{dt}}_{\text{energy}} + \underbrace{\frac{dWK}{dt}}_{\text{work}} \qquad \text{(Equation 11)}$$

There exist multiple approaches within the literature for developing additional equations for Reynolds stress terms in turbulent flow, but this invention adopts a Reynolds-stress-transport-type methodology. In this methodology, equations for Reynolds stresses take the following general form:

$$U_k \frac{\partial \overline{u_i' u_j'}}{\partial x_k} = P_{ij} - \Pi_{ij} - \frac{\partial J_{ijk}}{\partial x_k} - 2\varepsilon_{ij} \qquad \text{(Equations 12a-12f)}$$

where $P_{ij}$ is termed the production, $\Pi_{ij}$ is termed the pressure-strain correlation tensor, $J_{ijk}$ is termed the diffusive flux of the Reynolds stresses, and $\epsilon_{ij}$ is termed the dissipation tensor.

In the general case, equations for all six Reynolds stress terms, and for the energy dissipation rate must expressed. The equation for the isotropic dissipation rate, $\epsilon$, is similar in structure to the equations for the transport of Reynolds stresses. Full mathematical expressions for the Reynolds stress and isotropic dissipation rate equations shall be expressed in the following section for the specific case of a two-dimensional turbulent boundary layer.

In summary, the equations which are solved to determine turbulent boundary layer parameters include:

- the continuity equation, Equation 5,
- the three equations of motion, Equations 9a, 9b, 9c,
- six equations for Reynolds shear and normal stresses, Equations 12a–12f, and
- the equation for isotropic dissipation rate, $\epsilon$ (Equation 16 below).

The methodology for the solution of turbulent flow parameters involves a finite difference approximation of the system of equations of motion and continuity, with accompanying boundary conditions.

Turbulent Boundary Layer Equations: Complete mathematical formulations are provided for the specific case of a turbulent boundary layer with a steady, two-dimensional mean flow and a constant freestream velocity, $U_\infty$. Two-dimensional turbulent boundary layer equations, as termed in the literature, are derived from the general continuity equation (Equation 5) and equations of motion (Equations 9a–9c), given the assumptions that:

- The mean transverse velocity, W, is zero.
- Gravitational forces can be neglected.
- The pressure gradient is approximately zero in the y direction.
- The mean velocity in the streamwise direction, U, is much greater than the mean velocity in the normal direction, V.
- The rate of change of parameters in the x direction is much smaller than the rate of change of parameters in the y direction.

The above assumptions permit simplification of the set of equations required to solve for turbulent boundary layer parameters to include the revised continuity equation, Equation (13):

$$\frac{\partial U}{\partial x} + \frac{\partial V}{\partial y} = 0 \qquad \text{(Equation 13)}$$

and the equation of motion for the U velocity component (Equation 14):

$$U\frac{\partial U}{\partial x} + V\frac{\partial U}{\partial y} = -\frac{1}{\rho}\frac{\partial \mathcal{P}}{\partial x} + \nu\frac{\partial^2 U}{\partial y^2} - \frac{\partial \overline{u'v'}}{\partial y} \qquad \text{(Equation 14)}$$

Where transport equations for the six Reynolds stress components are required in the general case, the Reynolds shear stress components $-\overline{v'w'}$ and $-\overline{u'w'}$ are considered to be very small, so that only equations for $\overline{u'^2}$, $\overline{v'^2}$, $\overline{w'^2}$, and $-\overline{u'v'}$ are formulated in the format of Equation 12 (repeated below as Equations 15a–15d).

$$U_k \frac{\partial \overline{u_i' u_j'}}{\partial x_k} = P_{ij} - \Pi_{ij} - \frac{\partial J_{ijk}}{\partial x_k} - 2\varepsilon_{ij} \qquad \text{(Equations 15a-15d)}$$

where $P_{ij}$ is the production term, $\Pi_{ij}$ is the pressure-strain correlation tensor, $J_{ijk}$ is the diffusive flux of the Reynolds stresses, and $\epsilon_{ij}$ is the dissipation tensor. A fifth equation for $\epsilon$ is:

$$U\frac{\partial \varepsilon}{\partial x} + V\frac{\partial \varepsilon}{\partial y} = C_{s1} f_1 \frac{\varepsilon}{k} P_\Sigma - C_{s2} f_2 \frac{\varepsilon}{k}\left[\varepsilon - \nu\frac{\partial^2 k}{\partial y^2}\right] + \frac{\partial}{\partial y}\left(2\varepsilon_t \frac{\partial \varepsilon}{\partial y}\right) + \nu\frac{\partial^2 \varepsilon}{\partial y^2} \qquad \text{(Equation 16)}$$

where the expression for viscous diffusion may alternatively be approximated as:

$$\left[\nu\frac{\partial^2 k}{\partial y^2} = 2\nu\left(\frac{\partial k^{1/2}}{\partial y}\right)\right] \quad \text{(Equation 17)}$$

$$\nu\frac{\partial^2 k}{\partial y^2} \approx 2\nu\left(\frac{\partial k^{1/2}}{\partial y}\right) \quad \textit{(Equation 17)}$$

if required for numerical stability in solutions of viscoelastic, non-oscillating surfaces with limited grid points in the near-wall region.

In Equations (15a–15d), the term $P_{ij}$ may be expressed as:

$$P_{ij} = -\overline{u_i'u_k'}\frac{\partial U_j}{\partial x_k} - \overline{u_j'u_k'}\frac{\partial U_i}{\partial x_k} \quad \text{(Equations 18a-18d)}$$

In Equation (16), the term $P_\Sigma$ may be expressed as:

$$P_\Sigma = \frac{1}{2}P_{ii} \quad \text{(Equation 19)}$$

The pressure-strain correlation tensor, $\Pi_{ij}$, which redistributes energy between different components of Reynolds stresses, may be expressed as:

$$\Pi_{ij} = C_1\left(\frac{\varepsilon}{k}\right)\left(\overline{u_i'u_j'} - \delta_{ij}\frac{2}{3}k\right) + C_2\left(P_{ij} - \delta_{ij}\frac{2}{3}P_\Sigma\right) + \pi'_{ij,1} + \pi'_{ij,2} + \pi'_{ij,3} \quad \text{(Equations 20a-20d)}$$

where the $\pi'_{ij,1}$ terms represent near-wall redistribution of turbulent energy from the streamwise component to the normal and transverse components, the $\pi'_{ij,2}$ terms represent near-wall variation of the Reynolds stress tensor component production, and the $\pi'_{ij,3}$ terms represent near-wall redistribution of turbulent energy proportional to local vorticity:

$$\pi'_{ij,1} = -C_1'\frac{\varepsilon}{k}\left(\overline{v'^2}\delta_{ij} - \frac{3}{2}\left(\overline{v'u_i'}\delta_{jl} + \overline{v'u_j'}\delta_{il}\right)\right)f\left(\frac{1}{y}\right) \quad \text{(Equations 21a-21d)}$$

$$\pi'_{ij,2} = -C_2'\left(P_{ij} - \frac{2}{3}\delta_{ij}P_\Sigma\right)f\left(\frac{1}{y}\right) \quad \text{(Equations 22a-22d)}$$

$$\left[\pi'_{ij,3} = -C_3'(P_{ij} - D_{ij})f\left(\frac{1}{y}\right)\right] \quad \text{(Equations 23a-23d)}$$

$$\pi'_{ij,3} = C_3'(P_{ij} - D_{ij})f\left(\frac{1}{y}\right) \quad \textit{(Equations 23a-23d)}$$

Here $$f\left(\frac{1}{y}\right)$$

is a unique damping function for the near-wall region:

$$f\left(\frac{1}{y}\right) = \frac{R_t}{R_k}\left(1 + \sqrt{1 + \frac{100}{R_t}}\right) \quad \text{(Equation 24)}$$

where:

$$R_k = \frac{k^{1/2}y}{\nu} \quad \text{(Equation 25)}$$

and $$R_t = \frac{k^2}{\nu\varepsilon} \quad \text{(Equation 26)}$$

Here, $D_{ij}$ is a dissipation tensor:

$$D_{ij} = -\overline{u_i u_j}\frac{\partial U_i}{\partial x_j} - \overline{u_j u_i}\frac{\partial U_i}{\partial x_i} \quad \text{(Equations 27a-27d)}$$

$$\frac{\partial J_{ijk}}{\partial x_k}$$

is the gradient of turbulent and viscous diffusive flux of the Reynolds stresses in the boundary layer, where only one component remains in the boundary-layer representation:

$$-\frac{\partial J_{ijk}}{\partial x_2} \pm \underbrace{\frac{\partial}{\partial y}\left((AC)_t\frac{k}{\varepsilon}\left[\overline{v'^2}\frac{\partial \overline{u_i'u_j'}}{\partial y}\right]\right)}_{\text{turbulent diffusion}} + \underbrace{\nu\frac{\partial \overline{u_i'u_j'}}{\partial y^2}}_{\text{viscous diffusion}} \quad \text{(Equations 28a-28d)}$$

where A is 6 in the equation for $\overline{v'^2}$, 2 for $\overline{u'^2}$ and $\overline{w'^2}$, and 4 for $-\overline{u'v'}$ (i.e., the effective gradients of turbulent diffusion are different for different components of Reynolds stress), and where the coefficient of turbulent diffusion, $\epsilon_t$, is:

$$\varepsilon_t = C_t\frac{k}{\varepsilon}\overline{v'^2} \quad \text{(Equation 29)}$$

except for Equation (16), where:

$$C_t = C_\epsilon \quad \text{(Equation 30)}$$

The dissipation tensor, $\epsilon_{ij}$, is written as:

$$\varepsilon_{ij} = \nu\overline{\frac{\partial u_i'}{\partial x_k}\frac{\partial u_j'}{\partial x_k}} \approx f_s\frac{\overline{u_i'u_j'}}{2k}\varepsilon + (1 - f_s)\frac{1}{3}\delta_{ij}\varepsilon \quad \text{(Equations 31a-31d)}$$

where $f_s$ characterizes flow in the near-wall region:

$$f_s = \frac{1}{1 + 0.06R_t} \text{ and} \quad \text{(Equation 32)}$$

$$R_t = \frac{k^2}{\nu\varepsilon} \quad \text{(Equation 33)}$$

Equation (16) includes two functions, $f_1$ and $f_2$, which also introduce corrections for near-wall flows:

$$f_1 = 1 + 0.8e^{-R_t} \quad \text{(Equation 34)}$$

$$f_2 = 1 - 0.2e^{-R_t^2} \quad \text{(Equation 35)}$$

Values of constants for flow over a flat plate are as shown in Table 1:

| $C_1$ | $C_2$ | $C_{\epsilon 1}$ | $C_{a2}$ | $C_t$ | $C_\epsilon$ | $C_1'$ | $C_2'$ | $C_3'$ |
|---|---|---|---|---|---|---|---|---|
| 1.34 | 0.8 | 1.45 | 1.9 | 0.12 | 0.15 | 0.36 | 0.45 | 0.036 |

For the case of a two-dimensional boundary layer, turbulent boundary layer parameters at different x and y locations are determined through solution of the continuity equation (Equation 13), the equation of motion in the x-direction (Equation 14), the transport equations for the Reynolds stresses $\overline{u'^2}$, $\overline{v'^2}$, $\overline{w'^2}$, and $-\overline{u'v'}$ (Equations 15a–15d), and the equation for the isotropic energy dissipation rate (Equation 16), given appropriate boundary conditions. The problem is solved numerically using a finite difference approximation. All equations are reduced to a standard type of parabolic equation in terms of a given function, and solution is obtained at designated grid points in an (x,y) coordinate system.

Boundary Conditions: Boundary conditions are values of parameters at the limits of the boundary layer, i.e., at the surface and the freestream. The freestream velocity is defined as $U_\infty$. Boundary conditions at the surface are specified for Reynolds normal and shear stresses (kinematic boundary conditions), as well as for the isotropic dissipation rate (dynamic boundary condition). For an arbitrary geometry, the x and y coordinates of the surface must be specified. If the surface is a flat plate, the boundary will be along the line y=0.

Since oscillation amplitudes at the surface are small, linearized kinematic boundary conditions, where mean velocities at the surface are assumed to be zero, are appropriate. Boundary conditions for fluctuating velocity components at the surface of a flat plate are expressed as:

$$u'|_{y=0} = \frac{\partial \xi_1}{\partial t}\cos\Theta - \xi_2 \frac{u_*^2}{v} \quad \text{(Equation 36)}$$

$$v'|_{y=0} = \frac{\partial \xi_2}{\partial t} \quad \text{(Equation 37)}$$

$$w'|_{y=0} = \frac{\partial \xi_1}{\partial t}\sin\Theta \quad \text{(Equation 38)}$$

where $\xi_1$ and $\xi_2$ are the longitudinal and vertical surface displacement components, respectively, u* is the friction velocity (as previously defined), and $\Theta$ is the angle of the longitudinal axis relative to the mean flow in the $x_1$–$x_3$ plane. With linearized boundary conditions, mean velocities at the wall are assumed to be zero. Surface displacements are approximated by the first mode of a Fourier series:

$$\xi_i = \sum_{j=1}^{\infty} a_{ij} e^{i\alpha_j(x-Ct)} \approx a_{i1} e^{i\alpha_e(x-Ct)} \quad \text{(Equation 39)}$$

Here, $\alpha_3$ is the wavenumber corresponding to the maximum turbulent energy in the boundary layer, and is given by:

$$\alpha_e = \frac{\omega_e}{C} \quad \text{(Equation 40)}$$

where the energy-carrying frequency, $\omega_e$, is assumed to be:

$$\omega_e = \frac{U_\infty}{\delta} \quad \text{(Equation 41)}$$

and the phase speed corresponding to energy-carrying disturbances in the boundary layer is assumed to be:

$$C \approx 0.8U_\infty \quad \text{(Equation 42)}$$

Since there is a range of frequencies which carry energy, as reported within the scientific literature, it is advantageous to also perform calculations for the case where:

$$\omega_e = 2\frac{U_\infty}{\delta} \quad \text{(Equation 43)}$$

In the absence of resonance, it is appropriate to time-average components of the Reynolds stress at the wall:

$$\overline{u'^2}|_{y=0} = \frac{1}{2}\omega_e^2\left(|\xi_1|^2 + \frac{2u_*^2}{\omega_e v}|\xi_1||\xi_2|\sin(\varphi_2-\varphi_1) + \frac{1}{\omega_e^2}\left(\frac{u_*^2}{v}\right)^2|\xi_2|^2\right) \quad \text{(Equation 44)}$$

$$\overline{v'^2}|_{y=0} = \frac{1}{2}\omega_e^2|\xi_2|^2 \quad \text{(Equation 45)}$$

$$\overline{w'^2}|_{y=0} = \frac{1}{2}\omega_e^2|\xi_1|^2\tan^2\Theta \quad \text{(Equation 46)}$$

$$-\overline{u'v'}|_{y=0} = \frac{1}{2}\omega_e^2|\xi_2||\xi_1|\cos(\varphi_2-\varphi_1) \quad \text{(Equation 47)}$$

where $|\xi_i|$ is the rms amplitude of the displacement. For a passive isotropic viscoelastic coating excited by a forced load, the response takes the form of a traveling wave, so that the phase shift between normal and longitudinal [displacements, $\phi_2$–$\phi_1$, will be approximately $\pi/2$, and the] *displacements, $\phi_2$-$\phi_1$, will be approximately $\pi/2$, and the* Reynolds shear stresses at the surface will be approximately zero. For anisotropic materials, the phase shift can be different, so that negative Reynolds shear stresses can be generated at the wall. For a rigid wall, there will be no motion at the wall, so that Reynolds shear and normal stresses shall be equal to zero.

The boundary condition for the isotropic dissipation rate is:

$$\varepsilon|_{y=0} = \frac{\partial}{\partial y}\left[(v+\varepsilon_t)\frac{\partial k}{\partial y}\right]\Bigg|_{y=0} \quad \text{(Equation 48)}$$

where the first term reflects viscous dissipation and the second reflects absorption of energy by the viscoelastic material. For a rigid surface, there is no energy absorption at the wall, so that the second term equals zero. The absorption of turbulent energy by the coating is equivalent to $-\overline{p'v'}$, and can be approximated by $$\varepsilon_t \frac{\partial k}{\partial y}\Big|_{y=0},$$

which is the diffusive flux of energy across the boundary, characterized using a gradient mechanism for turbulent diffusion. This expression of the dynamic boundary condition is compatible with the Reynolds stress transport methodology of turbulence closure.

Equations 13, 14, 15a–15d, and 16 are solved for mean velocity components, Reynolds normal and shear stresses, and energy dissipation, given the kinematic and dynamic boundary conditions (Equations (44) through (48)) based on the solution of the viscoelasticity problem (as described in the following section). The problem is solved numerically, using finite difference approximations of the parabolic equations. Friction drag for a body with a viscoelastic coating is calculated as the integral of wall shear stresses, $\tau_w$, over the surface of the body, where:

$$\tau_w = \mu \frac{\partial U}{\partial y}\bigg|_{y=0} \qquad \text{(Equation 49)}$$

for a two-dimensional body, and where $\mu=\rho\nu$ is the dynamic viscosity. Comparison of results with those calculated for a rigid body of identical geometry under identical flow conditions leads to an estimation of anticipated friction drag reduction.

To reduce friction drag, it is necessary to minimize surface oscillation amplitudes, while maximizing the flux of turbulent energy from the flow into the coating, $-\overline{p'v'}$. If the amplitudes of surface oscillation, $\xi_2^+$, do not exceed the thickness of the viscous sublayer, generally where:

$$y^+ = \frac{yu_*}{\nu} < \approx 7 \qquad \text{(Equation 50)}$$

then the normal Reynolds stresses at the boundary (Equations (44)–(46)) may be approximated as zero. For a coating which absorbs energy, with low levels of oscillation, shear stresses in the near-wall region of the boundary layer decrease, as does the production of turbulence in the boundary layer. For a coating that oscillates at amplitudes greater than that of the viscous sublayer, the surface can act as a dynamic roughness element and thereby enhance the level of turbulence generated within the boundary layer.

Response of a Viscoelastic Material to a Turbulent Boundary Layer (VE Problem)

The second part of the methodology determines the response of a viscoelastic material to a turbulent boundary layer (step 2 in FIG. 2). For a rigid surface, Reynolds stresses on the surface (Equations (44) to (47)) are zero, and the isotropic dissipation rate contains only the viscous term. However, for a viscoelastic material, the kinematic and dynamic boundary conditions are determined through solution of the two-dimensional conservation of momentum equation for a viscoelastic material:

$$\rho_s \frac{\partial^2 \xi_i}{\partial t^2} = \frac{\partial \sigma_{ij}}{\partial x_j} \qquad \text{(Equations 51a-51b)}$$

[where $\rho_s$ is the material density, $\xi_2$ and $\xi_2$ are the longitudinal] *where $\rho_s$ is the material density, $\xi_1$ and $\xi_2$ are the longitudinal* and normal displacements through the thickness of the coating, and $\sigma_{ij}$ is the amplitude of the stress tensor. The stress tensor for a viscoelastic material is written for a Kelvin-Voigt type of material as:

$$\sigma_{ij}=\lambda(\omega)\epsilon^s\delta_{ij}+2\mu(\omega)\epsilon_{ij}^s \qquad \text{(Equations 52a–52d)}$$

where $\epsilon_{ij}^s$ is the strain tensor:

$$\varepsilon_{ij}^s = \frac{1}{2}\left(\frac{\partial \xi_i}{\partial x_j} + \frac{\partial \xi_j}{\partial x_i}\right) \qquad \text{(Equations 53a-53d)}$$

and:

$$\epsilon^s=\epsilon_{ii}^s \qquad \text{(Equation 54)}$$

$\lambda(\omega)$ is the frequency-dependent Lame constant, which is defined in terms of the bulk modulus, $K(\omega)$, which can be reasonably approximated as the static bulk modulus, $K_0$, and the complex shear modulus, $\mu(\omega)$:

$$\lambda(\omega) = K_0 - \frac{2}{3}\mu(\omega) \qquad \text{(Equation 55)}$$

Displacements, $\xi_i$, are approximated as periodic, in the form of Equation (39), and can be expressed as a function of potentials of longitudinal and transverse (shear) waves:

$$\vec{\xi} = \nabla\phi + \nabla\vec{\Psi}\vec{\Psi} = \{0, 0, \Psi\} \qquad \text{(Equation 56)}$$

where $\nabla_\phi$ is the gradient of $\phi$ and $\nabla\times\vec{\Psi}$ is the curl of the vector $\vec{\Psi}$. Equation (54) can be rewritten as two decoupled equations for the two wave potentials:

$$[2\mu(\omega) + \lambda(\omega)]\nabla^2\varphi = \rho_s \frac{\partial^2 \varphi}{\partial t^2} \qquad \text{(Equation 57)}$$

$$\mu(\omega)\nabla^2\Psi = \rho_s \frac{\partial^2 \Psi}{\partial t^2} \qquad \text{(Equation 58)}$$

Equations (57) and (58) can be solved for the potentials, $\phi$ and $\Psi$, and hence for displacements, velocities, and stresses through the thickness of the coating, if boundary conditions are specified. The coating is fixed at its base, so that the longitudinal and normal displacements are zero, and the shear stress and pressure load on the surface is known. Pressure and shear pulsations on the coatings are approximated as periodic functions, with a form similar to that of the displacements in Equation (39), but with the following magnitudes, respectively:

[$\tau_\omega=\rho u^{*2}$ (Equation 59)]

[$\rho_{rms}=K_p\tau_\omega.K_p\rho u^{*2}$ (Equation 60)]

$I_\omega=\rho\mu_\phi^2$ *(Equation 59)*

$\rho_{rms}=K_pI_{(t)}=K_p\rho\mu^{*2}$ *(Equation 60)* where $K_p$ is the Kraichnan parameter, whose value is approximated as 2.5.

If shear pulsations are included, a phase shift between shear and pressure pulsations must also be introduced.

If calculations are performed for a unit load, then surface displacements under actual load will be:

$$|\xi_i||_{P_{rms=actual}} = \frac{\rho K_p u_*^2 \, |\xi_i||_{P_{rms}=1}}{H} H\bar{u}_*^2 = C_{ki} H\bar{u}_*^2 \qquad \text{(Equation 61)}$$

Kinematic boundary conditions in Equations (44) to (47) for the turbulent boundary layer problem are rewritten in terms of output from the materials problem:

$$\frac{\overline{u'^2}}{U_\infty^2} = \frac{1}{2}\left(\frac{H}{\delta}\right)^2 (C_{k1} + \tilde{u}_* Re_* C_{k2})^2 \tilde{u}_*^4 \left(Re_* = \frac{u_*\delta}{v}\right) \quad \text{(Equation 62)}$$

$$\frac{\overline{v'^2}}{U_\infty^2} = \frac{1}{2}\left(\frac{H}{\delta}\right)^2 C_{k2}^2 \tilde{u}_*^4 \quad \text{(Equation 63)}$$

$$\frac{\overline{w'^2}}{U_\infty^2} = \frac{1}{2}\left(\frac{H}{\delta}\right)^2 C_{k1}^2 \tilde{u}_*^4 \tan^2\Theta \quad \text{(Equation 64)}$$

$$-\frac{\overline{u'v'}}{U_\infty^2} = 0 \quad \text{(Equation 65)}$$

Dynamic boundary conditions are rewritten in the form:

$$-\frac{\overline{p'v'}|_{y=0}}{\rho U_\infty^3} \approx \tilde{\varepsilon}_t \frac{\partial \tilde{k}}{\partial \tilde{y}}\bigg|_{y=0} \quad \text{(Equation 66)}$$

where:

$$C_{k3} = C_{k2} K_p \gamma(\omega)$$

and where $\gamma(\omega)$ is a dissipative function of the coating material.

The flux of turbulent fluctuating energy through the surface can be solved for directly, as:

$$-\overline{p'v'}|_{y=0} = -\tfrac{1}{4}|p'|\omega(-t\xi_2 + t\xi^*_2) \quad \text{(Equation 67)}$$

but the nondimensionalized flux can also be approximated as a diffusive flux term, using the gradient diffusion approach:

$$-\frac{\overline{p'v'}|_{y=0}}{\rho U_\infty^3} \approx \tilde{\varepsilon}_t \frac{\partial \tilde{k}}{\partial \tilde{y}}\bigg|_{y=0} \quad \text{(Equation 68)}$$

where:

$$\tilde{k} = \frac{k}{U_\infty^2} \quad \text{(Equation 69)}$$

$$\tilde{y} = \frac{y}{\delta} \quad \text{(Equation 70)}$$

$$\tilde{\varepsilon}_t = \frac{\varepsilon_t}{U_\infty \delta} \quad \text{(Equation 71)}$$

Equation 68 provides a basis for determining the value of the kinematic coefficient of turbulence diffusion, $\epsilon_q$, on an absorbing surface. Substituting Equation 68 into Equation [66 yields the following expression for $\epsilon_q$, defined as $\epsilon_t|_{y=0}$:] *66 yields the following expression for $\tilde{\epsilon}_q$, defined as $\tilde{\epsilon}_t|_{y=0}$:*

$$\tilde{\varepsilon}_q = \frac{\varepsilon_t|_{y=0}}{U_\infty \delta} = \frac{1}{4} C_{k3}\left(\frac{H}{\delta}\right)^2 \tilde{u}_* \frac{\tilde{u}_*^3 \Delta_{max}}{k_{max}^+ - k_q^+} \quad \text{(Equation 72)}$$

Here, $K^+_{max}$ is the maximum of turbulence kinetic energy, and $K^+_q$ is the kinetic energy of the oscillating surface, both quantities nondimensionalized by $U_\infty^2$. $y_{max}^+$ is defined as the normal distance from the surface to the maximum of turbulence energy, nondimensionalized as follows:

$$y_{max}^+ = \frac{y_{max}}{v} u_* \quad \text{(Equation 73)}$$

and:

$$\Delta_{max} = \frac{y^+}{Re_*} \quad \text{(Equation 74)}$$

where:

$$Re_* = \frac{u_*\delta}{v} \quad \text{(Equation 75)}$$

Thus we can determine the dissipation rate at the wall based on (Equation 48).

Methodology to Choose Properties of a Drag-Reducing Viscoelastic Material

A methodology to choose properties of a viscoelastic coating that reduces turbulent friction drag necessarily requires both of the previously described solutions for turbulent boundary layer parameters and response of a viscoelastic material.

For the case of two-dimensional flow over a flat plate, the TBL problem is solved for a rigid plate, in order to determine the boundary layer thickness, $\delta$, at a given freestream velocity, $U_\infty$, and location. The boundary layer thickness is determined from the finite difference solution of the seven equations of continuity, motion in the x-direction, transport equations for Reynolds normal and shear stresses, and the equation for dissipation rate, assuming no motion at the wall. The external limit of the boundary layer is defined as that location where the ratio of the mean velocity to the freestream velocity is a constant, $\beta$, between 0.95 and 1.0.

The frequency-dependent, complex shear modulus of a material, $\mu(\omega)$, can be expressed in different mathematical forms, some of which approximate experimentally measured shear modulus data more accurately than others. A single relaxation time (SRT) material is one where the complex shear modulus is expressed using a single relaxation time, $\tau_s$, [and a single value for the dynamic shear modulus, $\mu_2$. In] *and a single value for the dynamic shear modulus $\mu_2$. In* Equation (76), an SRT material would be represented for the case of N=1. A multiple relaxation time (MRT) material is one where N>1 in the representation for complex shear modulus in Equation (78).

$$\mu(\omega) = \mu_0 + \sum_{j=1}^{N} \mu_j \left[\frac{(\omega\tau_j)^2}{1 + (\omega\tau_j)^2} + i\frac{\omega\tau_j}{1 + (\omega\tau_j)^2}\right] \quad \text{(Equation 76)}$$

The Havriliak-Negami (HN) representation for the complex shear modulus, is given by Equation 74. This equation is more complex, but often is more suitable for describing real materials:

$$\frac{\mu - \mu_\infty}{\mu_0 - \mu_\infty} = \frac{1}{[1 + (i\omega\tau_{HN})^{\alpha_{HN}}]^{\beta_{HN}}} \quad \text{(Equation 77)}$$

For a HN type of material, whose complex shear modulus is expressed in the form of Equation (77), $\mu_\infty$ is the limiting high-frequency modulus and $\alpha_{HN}$ and $\beta_{HN}$ are constants. For the type of polymeric materials used for drag-reducing coatings, $K(\omega)$ is essentially constant, with a value of approximately $1\times10^8$ Pa.

It is recommended to first determine an optimal SRT type of material, and then to choose an HN type of material, whose properties can be created with available polymer chemistry.

An SRT material can be adequately characterized by the material thickness, H, the density, $\rho_s$, the static shear modulus, $\mu_0$, the dynamic shear modulus, $\mu_s$, and the relaxation time, $\tau$. An appropriate density for the viscoelastic material, $\rho_s$, is within 10% that of water. For an SRT material, the initial guess for the static shear modulus of the material, $\mu_0$, is:

$$\mu_0=\rho_s C^2 \quad \text{(Equation 78)}$$

based on the criterion that the speed of shear waves in the material is approximately the same as the phase speed of the energy-carrying disturbances, C. This phase speed, C, is assumed to be 0.8 of the value of the freestream velocity, $U_\infty$ (Equation 42). If the convective velocity exceeds the shear wave velocity, an instability occurs, and large waves appear on the surface of the material, leading to an increase of drag for the coating.

An initial choice for thickness, H, for isotropic viscous materials, where $$\frac{\mu_s}{\mu_0} > 1$$

is:

$$H = \frac{3C}{\omega_e} \quad \text{(Equation 79)}$$

and for isotropic, low viscosity materials, where $$\frac{\mu_s}{\mu_0} < 1$$

is:

$$H = \frac{5C}{\omega_e} \quad \text{(Equation 80)}$$

The optimal desired thickness for a coating may be greater than practical for a given application. While isotropic coatings thinner than recommended in Equations 79–80 can still be effective, anisotropic coatings that are stiffer in the normal dimension relative to the transverse and longitudinal dimensions can provide equivalent performance with significant reduction in thickness.

Given specified values of H, $\mu_0$, and $\rho_s$, the VE problem, as expressed in Equations (57) and (58), is solved numerically for a matrix of values of $\tau_s$ and $\mu_s$ (i.e., for different values of the complex shear modulus) and for a range of wavenumbers. The wavenumber corresponding to the maximum turbulent energy in the boundary layer is:

$$\alpha_e = \frac{\omega_e}{C} \quad \text{(Equation 81)}$$

where the frequency, $\omega_e$, for maximum energy-carrying disturbances is estimated by Equation (41). Calculations yield surface displacement amplitudes and the flux of turbulent fluctuating energy into the coating. The best combination of properties for a SRT material occurs where the surface displacement under actual load (Equation (61)) is less than the viscous sublayer thickness, and where the energy flux into the coating (Equation (57)) is at a maximum. Furthermore, it is desirable to maintain this criterion for a range of frequencies from approximately one decade below to one decade above the energy-carrying frequency, $\omega_e$.

Once a set of optimal values of $\tau_s$ and $\mu_s$ are determined for a set of specified values of H, $\mu_0$, and $\rho_s$, the calculations are iterated using slightly different values of thickness, H, and static modulus, $\mu_0$. From these calculations are chosen the optimal set of parameters for an SRT material (H, $\mu_0$, $\rho_s$, $\tau_s$ and $\mu_s$), given specified flow conditions and configuration.

The complex shear moduli of real polymeric materials, such as polyurethanes and silicones, which are candidates for viscoelastic coatings cannot be adequately described by the SRT representation. More complex MRT or HN representations of the shear modulus require multiple constants, and are less suitable for numerical parametric evaluation. Therefore, results for SRT materials are used to select candidate materials, such as described by the HN formulation (Equation (79)) which can be more readily fabricated in practice. As a guideline, it is desired to match the complex shear modulus curves of the target SRT material and the HN material (value and slope) over frequencies ranging from decade below to one decade above $\omega_e$, with the most important matching being in the immediate vicinity of $\omega_e$.

To design a multi-layer isotropic coating, properties of a complex shear modulus, density, and thickness are specified for individual layers, and non-slip boundary conditions between layers are imposed. The properties of the upper layer are specified according to the methodology for a single layer, and the lower layers will have progressively lower static shear moduli, as optimized for lower freestream velocities. Thus, well-designed multi-layer coatings can reduce drag over a range of freestream velocities.

In the design of an anisotropic coating, the complex shear modulus has different values in the normal direction relative to the longitudinal and transverse directions (hereinafter termed transversely isotropic). If the viscoelastic material follows a single-relaxation time model, then the static shear modulus, $\mu_0$, the dynamic shear modulus, $\mu_s$, and the relaxation time, $\tau_s$, will differ with direction, as expressed in Equations (82) and (83). The static shear modulus in the normal direction, $\mu_{01}$, will be greater than than in the longitudinal-transverse plane, $\mu_{02}$. The complex shear modulus in the normal direction is expressed as:

$$\mu_1(\omega) = \mu_{01} + \mu_{s1}\left[\frac{(\omega\tau_{s1})^2}{1+(\omega\tau_{s1})^2} + i\frac{\omega\tau_{s1}}{1+(\omega\tau_{s1})^2}\right] \quad \text{(Equation 82)}$$

while the shear modulus in the streamwise and transverse directions is expressed as:

$$\mu_2(\omega) = \mu_{02} + \mu_{s2}\left[\frac{(\omega\tau_{s2})^2}{1+(\omega\tau_{s2})^2} + i\frac{\omega\tau_{s2}}{1+(\omega\tau_{s2})^2}\right] \quad \text{(Equation 83)}$$

For a viscoelastic, transversely isotropic material, surface oscillation amplitudes can be reduced relative to an isotropic material, while the level of energy flux into the material is increased. Thus, well-designed anisotropic coatings will be significantly thinner than isotropic coatings associated with the same level of drag reduction.

Methodology to Choose Structure of a Drag-Reducing Viscoelastic Coating

Figure 3:
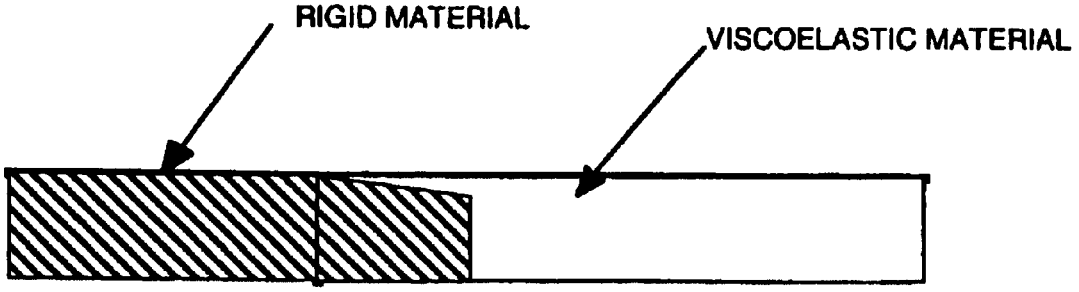
FIG. 3 is a detail of a structure introduced at the intersection between a viscoelastic coating and a rigid surface in order to minimize local oscillation amplitude and edge effects.

A further aspect of coating design is the choice of internal structure within the viscoelastic material. In practical applications of viscoelastic coatings, the coating will be finite in length, with leading, trailing, and side edges. The influence of the finite edges affects coating performance. Well posed edges can order and stabilize transverse and longitudinal vortical structures in the near-wall region of the flow and thereby delay the deformation of these vortical structures and enhance the stability of the flow. However, unstructured edges can accentuate the amplitude of oscillations of the viscoelastic material in this region. Local instabilities can degrade the performance of the coating, so that, even with a well-designed material, the influence of the edges can lead to a drag increase. Hence, the coating is structured in the vicinity of finite edges. The thickness of the coating is decreased to minimize such oscillations, using techniques such as a rigid wedge underneath the coating, or other localized structure near an edge (FIG. 3). For large bodies, a continuous coating may be impractical or difficult to fabricate. An alternative design is a piecewise continuous coating, composed of finite segments of coating, where both the longitudinal and transverse edges of the coating system are organized to stabilize flow structures and to minimize adverse effects at the edges of each segment.

In addition to well-posed edges, viscoelastic coatings may be combined with surface structure to enhance the stabilization of longitudinal vortices along the length of the coating, and hence to increase the level of drag reduction through multiple physical mechanisms. Structure can include the placement of riblets on top of the viscoelastic coating, or the creation of so-called "inverse" riblets. In the latter case, a viscoelastic coating may be molded over ribs or ridges of rigid material, so that longitudinal riblet structures form when fluid flows over the viscoelastic surface.

The dimensions (scales) of the segments and the dimensions of the structures within the coating are selected as multiples of the transverse and longitudinal scales in the near wall turbulent flow. These scales vary with body speed, position along the body and when non-Newtonian additives, such as dilute aqueous solutions of high-molecular weight polymers, are present.

What is claimed is:

1. A method for estimating the reduction in friction drag of a body with a viscoelastic coating as compared to the friction drag of a rigid surface of identical size and shape as said body, during turbulent flow at a specified freestream velocity, said method comprising the following steps, performed in the order indicated:

(I) using boundary conditions for a rigid surface, determining characteristics of a turbulent boundary layer at the specified freestream velocity, said characteristics including the boundary layer thickness, phase speed and frequency corresponding to maximum-energy-carrying disturbances, mean velocity profiles, Reynolds stress distributions, wall shear stress distribution, and friction drag, (II) selecting a density, complex shear modulus, and thickness of a viscoelastic coating which corresponds to minimum oscillation amplitudes and maximum flux of energy into the viscoelastic coating during excitation by a forcing function substantially identical to the excitation produced by the turbulent boundary layer as determined in step I, and (III) using oscillation amplitudes and energy flux corresponding to the viscoelastic coating of selected density, complex shear modulus and thickness as determined in step II, determining characteristics of the turbulent boundary layer at the specified freestream velocity, including mean velocity profiles, Reynolds stress distributions, wall shear stress distribution, and friction drag, and (IV) determining a percentage reduction in friction drag as the ratio of i) the friction drag as determined in step I minus the friction drag as determined in step III, divided by ii) the friction drag as determined in step I.

2. The method of claim 1, wherein step I thereof includes the following substeps, not necessarily performed in the order indicated:

(a) for a rigid surface of specified geometry, and for a given freestream velocity, $U_\infty$, solving the equation of continuity:

$$\frac{\partial U_i}{\partial x_i} = 0$$

and the equations of motion for an incompressible fluid and steady flow with constant kinematic viscosity, $\nu$, constant density, $\rho$, negligible body forces, and gradients of pressure, P:

$$U_j \frac{\partial U_i}{\partial x_j} = -\frac{1}{\rho}\frac{\partial \mathcal{P}}{\partial x_i} + g_i + \nu \frac{\partial^2 U_i}{\partial x_j \partial x_j}$$

where $U_i$ refers to velocity components in the x, y, and z directions ($x_1$, $x_2$, and $x_3$ in indicial notation) and where fluid velocities at the surface of the body are zero, (b) from the velocity field, $U_i$, determined from the solution of the general continuity and motion equations in step 2(a), determining the boundary layer thickness as a function of body geometry, where the edge of the boundary layer is defined as that location where the ratio of mean velocity to the freestream velocity is a constant, $\beta$, between 0.95 and 1.0:

$$\left.\frac{U}{U_\infty}\right|_{\frac{y}{\delta}=1} = \beta$$

(c) from the solution of the general continuity and motion equations in step 2(a), determining the shear stress, $\tau_w$, along the body, the local coefficient of friction drag, and the integral drag, and (d) estimating the frequency, $\omega_e$, and the phase speed, C, corresponding to maximum-energy-carrying disturbances in the boundary layer.

3. The method of claim 2, wherein in substep 2(b), the boundary layer thickness is approximated as that location where the ratio of the mean velocity to the freestream [velocity has a constant value of $\beta$=9975.] *velocity has a constant value of* $\beta$*=0.9975.*

4. The method of claim 2, wherein in substep 2(d), the maximum energy-carrying frequency for disturbances in the boundary layer is estimated as:

$$\omega_e = \frac{U_\infty}{\delta}$$

and the phase speed corresponding to energy-carrying disturbances in the boundary layer is assumed to be:

$$C=0.8U_\infty.$$

5. The method of claim (2), for the case of two-dimensional flow over a flat plate, wherein the equations of continuity and the equations of motion are reduced to the following system of equations, where a Reynolds transport approach is adopted for turbulence closure, and where P is the mean pressure, ν is the kinematic viscosity, ρ is the density, U is the mean longitudinal velocity component, V is the mean normal velocity component, and u', v', and w' are components of fluctuating velocity in the streamwise, normal, and transverse directions, respectively, and ϵ is the isotropic dissipation rate:

$$\frac{\partial U}{\partial x}+\frac{\partial V}{\partial y}=0$$

$$U\frac{\partial U}{\partial x}+V\frac{\partial U}{\partial y}=-\frac{1}{\rho}\frac{\partial \mathcal{P}}{\partial x_i}+\nu\frac{\partial^2 U}{\partial y^2}-\frac{\partial \overline{u'v'}}{\partial y}$$

$$U_k\frac{\partial \overline{u_i'u_j'}}{\partial x_k}=P_{ij}-\Pi_{ij}-\frac{\partial J_{ijk}}{\partial x_k}-2\varepsilon_{ij}$$

$$U\frac{\partial \varepsilon}{\partial x}+V\frac{\partial \varepsilon}{\partial y}=C_{\varepsilon 1}f_1\frac{\varepsilon}{k}P_\Sigma-C_{\varepsilon 2}f_2\frac{\varepsilon}{k}\left[\varepsilon-\nu\frac{\partial^2 k}{\partial y^2}\right]+\frac{\partial}{\partial y}\left(2\varepsilon_t\frac{\partial \varepsilon}{\partial y}\right)+\nu\frac{\partial^2 \varepsilon}{\partial y^2}$$

where:

$P_{ij}$ is the production tensor, expressed as $$[P_{ij}=-\overline{u_i'u_k'}\frac{\partial U_j}{\partial x_k}-\overline{u_j'u_k'}\frac{\partial U_i}{\partial x_k}P_\Sigma=\frac{1}{2}P_{ii}]$$

$$P_{if}=-\overline{u_i'u_k'}\frac{\partial U_j}{\partial x_k}-\overline{u_j'u_k'}\frac{\partial U_i}{\partial x_k}$$

$$P_\Sigma=\frac{1}{2}P_{ii}$$

$\Pi_{ij}$ is the pressure-strain correlation tensor, expressed as:

$$\Pi_{ij}=C_1\left(\frac{\varepsilon}{k}\right)\left(\overline{u_i'u_j'}-\delta_{ij}\frac{2}{3}k\right)+C_2\left(P_{ij}-\delta_{ij}\frac{2}{3}P_\Sigma\right)-\left(C_i'\frac{\varepsilon}{k}\left(\overline{v'^2}\delta_{ij}-\frac{3}{2}\left(\overline{v'u_i'}\delta_{ij}\right)\right)+C_2'\left(P_{ij}-\frac{2}{3}\delta_{ij}P_\Sigma\right)-C_2'(P_{ij}-D_{ij})\right)\frac{R_t}{R_k}\left(1+\sqrt{1+\frac{100}{R_t}}\right)$$

where:

k is the turbulent kinetic energy, expressed as $$k=\frac{1}{2}\left(\overline{u'^2}+\overline{v'^2}+\overline{w'^2}\right)$$

$D_{ij}$ is the dissipation tensor, expressed as $$D_{ij}=-\overline{u_iu_j}\frac{\partial U_i}{\partial x_j}-\overline{u_ju_i}\frac{\partial U_i}{\partial x_i}$$

$$R_t=\frac{k^2}{\nu\varepsilon}$$

is a nondimensional ratio between the square of the kinetic energy and the product of the kinematic viscosity and dissipation velocity $$R_k=\frac{k^{1/2}y}{\nu}$$

is the distance from the wall, nondimensionalized by the ratio of the kinematic viscosity to the square of the kinetic energy $C_1$, $C_2$, $C_1'$, $C_2'$, and $C_3'$ are constants, defined as $C_1$=1.34, $C_2$=0.8, $C_1'$=0.36, $C_2'$=0.45, and $C_3'$=0.036

$J_{ijk}$ is the tensor that describes the diffusive flux of the Reynolds stresses, components of which are expressed as:

$$-\frac{\partial J_{ijk}}{\partial x_1}\approx 0$$

$$-\frac{\partial J_{ijk}}{\partial x_3}\approx 0$$

$$-\frac{\partial J_{ijk}}{\partial x_2}\approx \underbrace{\frac{\partial}{\partial y}\left((AC)_t\frac{\kappa}{\varepsilon}\left[\overline{v'^2}\frac{\partial \overline{u_i'u_j'}}{\partial y}\right]\right)}_{\text{turbulent diffusion}}+\underbrace{\nu\frac{\partial^2 \overline{u_i'u_j'}}{\partial y^2}}_{\text{viscous diffusion}}$$

where A is 6 for $\overline{v'^2}$, 2 for $\overline{u'^2}$ and $\overline{w'^2}$, and 4 for $-\overline{u'v'}$, where $C_1$ is a constant, defined as 0.12

$\epsilon_{ij}$ is the dissipation tensor, expressed as:

$$\varepsilon_{ij}=\frac{1}{1+0.06R_t}\frac{\overline{u_i'u_j'}}{2k}\varepsilon+\left(1-\frac{1}{1+0.06R_t}\right)\frac{1}{3}\delta_{ij}\varepsilon$$

$C_{\epsilon 1}$ and $C_{\epsilon 2}$ are constants, defined as $C_{\epsilon 1}$=1.45 and $C_{\epsilon 2}$=1.9

$\epsilon_t$ is the coefficient of turbulent diffusion, defined as $$\varepsilon_t=C_t\frac{k}{\varepsilon}\overline{v'^2},$$

except in the equation for the isotropic dissipation rate, where $$\varepsilon_t=C_\varepsilon\frac{k}{\varepsilon}\overline{v'^2},$$

and where $C_\epsilon$=0.15, $f_1=1+0.8e^{-R_t}$ $f_2=1-0.2e^{-R_t2}$.

6. The method of claim 5 wherein Reynolds stress boundary conditions are derived from values of surface amplitudes, $\xi_1$ and $\xi_2$, calculated from solution of the momentum equation for a viscoelastic material:

$$\overline{u'^2}|_{y=0}=\frac{1}{2}\omega_e^2\left(|\xi_1|^2+\frac{2u_*^2}{\omega_e\nu}|\xi_1||\xi_2|\sin(\varphi_2-\varphi_1)+\frac{1}{\omega_e^2}\left(\frac{u_*^2}{\nu}\right)^2|\xi_2|^2\right)$$

$$\overline{v'^2}|_{y=0}=\frac{1}{2}\omega_e^2|\xi_2|^2$$

$$\overline{w'^2}|_{y=0}=\frac{1}{2}\omega_e^2|\xi_1|^2\tan^2\Theta$$

$$-\overline{u'v'}|_{y=0}=\frac{1}{2}\omega_e^2|\xi_2||\xi_1|\cos(\varphi_2-\varphi_1)$$

where:

$$\omega_e=\frac{U_\infty}{\delta}$$

($\phi_2-\phi_1$, is the phase difference between normal and longitudinal oscillation amplitudes Θ is the angle between the mean flow and the x-axis [u* is the friction velocity, defined as] $\mu_\phi$ *is the friction*

*velocity, defined as*

$$u_* = \sqrt{\frac{\tau_w}{\rho}},$$

where:

ρ is the density of the fluid, and $\tau_w$ is the shear stress at the wall, expressed as $$\tau_w = \rho\nu\frac{\partial U}{\partial y}\bigg|_{y=0}$$

$|\xi_i|$ is the root-mean-square (rms) amplitude of the displacement.

7. The method of claim 6 wherein the energy boundary condition is expressed in terms of the solution of the momentum equation for a viscoelastic material where:

(a) the energy flux into the coating is determined from the pressure velocity correlation, which, given a periodic forcing function can be expressed in terms of the amplitude of the normal oscillation amplitude (and its complex conjugate, as designated by *):

$$-\overline{p'v'}\big|_{y=0} = -\frac{1}{4}|p'|\omega(-i\xi_2 + i\xi_2^*)$$

(b) the amplitude of surface oscillations, $\xi_2$, given surface loading corresponding to the turbulent boundary layer, is expressed as:

$$|\xi_2||_{p_{rms=actual}} = \frac{\rho K_p u_*^2 |\xi_2||_{p_{rms}=1}}{H}H\tilde{u}_*^2 = C_{k2}H\tilde{u}_*^2$$

where:

H is the thickness of the coating, $$\tilde{u}_* = \frac{u_*}{U_\infty}, \text{ and}$$

[u* is the friction velocity, defined as] $\mu_0$ *is the friction velocity, defined as*

$$u_* = \sqrt{\frac{\tau_w}{\rho}},$$

where:

ρ is the density of the fluid, and $\tau_w$ is the shear stress at the wall, expressed as $$\tau_w = \rho\nu\frac{\partial U}{\partial y}\bigg|_{y=0}$$

so that the pressure velocity correlation can be expressed as:

$$-\frac{-\overline{p'v'}\big|_{y=0}}{\rho U_\infty^3} = -\frac{1}{4}\frac{H}{\delta}C_{k3}\tilde{u}_*^4$$

where:

$C_{k3}=C_{k2}K_p\gamma(\omega)$ and where $K_p$ is the Kraichnan parameter, with a value of 2.5, and γ(ω) is a dissipative function of the coating material, which reflects the phase shift between the pressure fluctuations and the vertical displacement of the coating, (c) the flux of energy into the coating can be approximated by an effective turbulent diffusion term, $$\varepsilon_t\frac{\partial k}{\partial y},$$

where:

$$\varepsilon_t = C_t\frac{k}{\varepsilon}\overline{v'^2},$$

where $C_t$=0.12 so that, in terms of nondimensionalized quantities:

$$-\frac{-\overline{p'v'}\big|_{y=0}}{\rho U_\infty^3} \approx \tilde{\varepsilon}_t\frac{\partial\tilde{k}}{\partial\tilde{y}}\bigg|_{y=0}$$

where:

$$\tilde{\varepsilon}_t = \frac{\varepsilon_t}{U_\infty\delta}$$

$$\tilde{k} = \frac{k}{U_\infty^2}$$

and:

$$\tilde{y} = \frac{y}{\delta}$$

(d) given the expression for nondimensionalized pressure-velocity correlation in step (b) and in step (c), $\epsilon_q=\epsilon_t|_{y=0}$ can be written as:

$$\tilde{\varepsilon}_q = \frac{\varepsilon_t|_{y=0}}{U_\infty\delta} = \frac{1}{4}C_{k3}\left(\frac{H}{\delta}\right)\tilde{u}_*\frac{\tilde{u}_*^3\Delta_{max}}{k_{max}^+ - k_q^+}$$

where $\gamma_{max}^+$ is the normal distance from the surface to the maximum of turbulence energy, nondimensionalized as follows:

$$y_{max}^+ = \frac{y_{max}}{\nu}u_*$$

$$\Delta_{max} = \frac{y^+}{Re_*}$$

where:

$$Re_* = \frac{u_*\delta}{\nu}$$

is the Reynolds number based on friction velocity, [u*, and boundary layer thickness, δ u* is the friction velocity, defined as] $\mu_0$, *and boundary layer thickness,* δ

*$\mu_0$ is the friction velocity, defined above as*

$$u_* = \sqrt{\frac{\tau_w}{\rho}},$$

where:

ρ is the density of the fluid, and $\tau_w$ is the shear stress at the wall, expressed as $$\tau_w = \rho v \left.\frac{\partial U}{\partial y}\right|_{y=0}$$

and $$k^+_{max} = \frac{k_{max}}{U^2_\infty}$$

is the maximum of turbulence kinetic energy, non-dimensionalized by $U_\infty{}^2$ $$k^+_q = \frac{k_q}{U^2_\infty}$$

is the kinetic energy of the oscillating surface, non-dimensionalized by $U_\infty{}^2$ (e) the boundary condition for isotropic dissipation rate is expressed dimensionally as:

$$\varepsilon|_{y=0} = \frac{\partial}{\partial y}\left[(v+\varepsilon_t)\frac{\partial k}{\partial y}\right]\Bigg|_{y=0}$$

or, in nondimensional form:

$$\tilde{\varepsilon}|_{y=0} = \frac{\partial}{\partial y}\left[\left(\frac{1}{Re}+\tilde{\varepsilon}_t\right)\frac{\partial \tilde{k}}{\partial \tilde{y}}\right]\Bigg|_{y=0}$$

where:

$$Re = \frac{U_\infty \delta}{v}$$

is the Reynolds number based on freestream velocity and boundary layer thickness.

8. The method of claim 7, where the solution of the turbulent boundary layer problem for an isotropic viscoelastic surface is based upon an iterative technique, and where initial values are assumed for u* and for the gradient of turbulent kinetic energy, $$\left.\frac{\partial k}{\partial y}\right|_{y=0}$$

as based upon the solution of the turbulent boundary layer problem for a rigid flat plate, with two-dimensional flow, where the boundary conditions are:

$$\left.\frac{\overline{u'^2}}{U^2_\infty}\right|_{y=0} = 0$$

-continued $$\left.\frac{\overline{v'^2}}{U^2_\infty}\right|_{y=0} = 0$$

$$\left.\frac{\overline{w'^2}}{U^2_\infty}\right|_{y=0} = 0$$

$$\left.\frac{\overline{u'v'}}{U^2_\infty}\right|_{y=0} = 0$$

$$\varepsilon|_{y=0} = v\left.\frac{\partial^2 k}{\partial y^2}\right|_{y=0}$$

[where the values of u* and the gradient of turbulent kinetic] *where the values of $\mu_0$ and the gradient of turbulent kinetic* energy, $$\left.\frac{\partial k}{\partial y}\right|_{y=0},$$

obtained from this solution are used to determine boundary conditions for the next iteration, and where this procedure continues until the solution converges.

9. The method for estimating the reduction in friction drag according to claim 8, for the case of two-dimensional flow over a flat plate coated by an isotropic viscoelastic material, wherein:

a.) the value of the shear modulus, μ(ω), is constant in all directions, b.) the phase difference between normal and longitudinal displacements at the wall is equal to π/2, so that the Reynolds shear stresses at the surface of the viscoelastic coating are equal to zero:

$$-\overline{u'v'}=0$$

c) Reynolds stress boundary conditions are expressed in non-dimensional form as:

$$\frac{\overline{u'^2}}{U^2_\infty} = \frac{1}{2}\left(\frac{H}{\delta}\right)^2 (C_{k1} + \tilde{u}_* Re_* C_{k2})^2 \tilde{u}^4_*$$

$$\frac{\overline{v'^2}}{U^2_\infty} = \frac{1}{2}\left(\frac{H}{\delta}\right)^2 C^2_{k2}\tilde{u}^4_*$$

$$\frac{\overline{w'^2}}{U^2_\infty} = \frac{1}{2}\left(\frac{H}{\delta}\right)^2 C^2_{k1}\tilde{u}^4_* \tan^2\Theta$$

$$-\frac{\overline{u'v'}}{U^2_\infty} = 0$$

where $$Re_* = \frac{u_* \delta}{v}$$

is the Reynolds number based on friction velocity, [u*, and boundary layer thickness, δ u* is the friction velocity, defined as]

*$\mu_0$, and boundary layer thickness,* δ

$\mu_0$ *is the friction velocity, defined above as*

$$u_* = \sqrt{\frac{\tau_w}{\rho}},$$

where:

$\rho$ is the density of the fluid, and $\tau_\omega$ is the shear stress at the wall, expressed as $$\tau_w = \rho\nu\frac{\partial U}{\partial y}\Big|_{y=0}$$

$$\tilde{u}_* = \frac{u_*}{U_\infty}$$

$$C_{ki} = \frac{\rho K_p u_*^2 |\xi_i||_{p_{rms}=1}}{H}$$

$$K_p = 2.5$$

and where $C_{k1}$ and $C_{k2}$ can be approximated as zero if the amplitude of surface oscillations is less than the thickness of the viscous sublayer.

10. The method according to claim 8, wherein the coating is composed of multiple layers of isotropic viscoelastic materials with different material properties, where:

a.) the shear modulus, $\mu(\omega)$, is constant within each of the multiple layers;

b.) boundaries between layers are fixed, and c.) the static shear modulus of the material is progressively lower for each layer from the top layer to the bottom layer of the coating.

11. The method according to claim 8, wherein the coating is composed of an anisotropic material, where the properties of the material in the normal direction (y) differ from those in the transverse (x-z) plane, wherein the shear modulus in the streamwise and transverse directions is given by $\mu_1(\omega)$, and the shear modulus in the normal direction is given by $\mu_2(\omega)$:

$$\mu_1(\omega) = \mu_{01} + \mu_{s1}\left[\frac{(\omega\tau_{s1})^2}{1+(\omega\tau_{s1})^2} + i\frac{\omega\tau_{s1}}{1+(\omega\tau_{s1})^2}\right]$$

$$\mu_2(\omega) = \mu_{02} + \mu_{s2}\left[\frac{(\omega\tau_{s2})^2}{1+(\omega\tau_{s2})^2} + i\frac{\omega\tau_{s2}}{1+(\omega\tau_{s2})^2}\right].$$

12. The method of claim 1, wherein step II thereof includes the following substeps, not necessarily performed in the order indicated:

(a) choosing a density, $\rho_s$, for the coating which is within 10% of the density of water, (b) selecting an initial choice for the static shear modulus, $\mu_0$, of the material to avoid resonance conditions, based on the criterion that the speed of shear waves in the material, $$\sqrt{\frac{\mu_0}{\rho_s}},$$

is approximately the same as the phase speed, C, of energy-carrying disturbances, (c) selecting an initial choice for coating thickness, H, (d) solving the momentum equation for a viscoelastic material:

$$\rho_s\frac{\partial^2\xi_i}{\partial t^2} = \frac{\partial\sigma_{ij}}{\partial x_j}$$

given harmonic loading of unit amplitude, phase velocity, C, corresponding to the load of the turbulent boundary layer, and variable wavenumber and for a coating which is fixed at its base to a rigid substrate, where:

$\xi_1$ and $\xi_2$ are the longitudinal and normal displacements through the thickness of the coating, approximated by the first mode of a Fourier series as follows:

$$\xi_i = a_{i1}e^{i\alpha_e(x-Ct)}$$

where $a_{i1}$ is a coefficient, $\alpha_e=\omega_e/C$ is the wavenumber corresponding to maximum energy in the boundary layer, and $\phi_i$ is a phase difference, $\sigma_{ij}$ is the stress tensor, written for a Kelvin-Voigt type viscoelastic material as:

$$\sigma_{ij} = \lambda(\omega)\epsilon^s\delta_{ij} + 2\mu(\omega)\epsilon_{ij}^s$$

where $\epsilon_{ij}^s$ is the strain tensor, expressed as:

$$\varepsilon_{ij}^s = \frac{1}{2}\left(\frac{\partial\xi_i}{\partial x_j} + \frac{\partial\xi_j}{\partial x_i}\right)$$

where $\epsilon^s = \epsilon_{ii}^s$, $\lambda(\omega)$ is the frequency-dependent Lame constant, defined in terms of the bulk modulus, $K(\omega)$, and the complex shear modulus, $\lambda(\omega)$:

$$\lambda(\omega) = K_0 - \frac{2}{3}\mu(\omega)$$

$\mu(\omega)$ is constant in all directions for an isotropic material, but will have different values in different directions for an anisotropic material, and where the momentum equation is solved for a series of materials whose shear moduli can be approximated for a single-relaxation type (SRT) of material, characterized mathematically in the form:

$$\mu(\omega) = \mu_0 + \mu_s\left[\frac{(\omega\tau_s)^2}{1+(\omega\tau_s)^2} + i\frac{\omega\tau_s}{1+(\omega\tau_s)^2}\right]$$

with an initial value of static shear modulus, $\mu_0=\mu|_{\omega=0}$, determined in step 3(b), and for different values of dynamic shear modulus, $\mu_s$, and relaxation time, $\tau_s$, where:

$$\mu_s = \mu|_{\omega=\infty} - \mu_0$$

(e) from the series of SRT materials for which calculations were performed in step 3(d), selecting a material where the calculated oscillation amplitude does not exceed the viscous sublayer thickness under given flow conditions, and where the energy flux into the coating is considered over a range of frequencies approximately one decade above and below the energy-carrying frequency, $\omega_e$, (f) iterating steps 3(d) and 3(e) with different values of thickness and static modulus, and determine the optimal combination of material properties for a single relaxation time (SRT) type of material, (g) using the results from step 3(f) as a guideline in the frequency range of interest, solving the momentum equation for viscoelastic materials whose complex shear modulus may be characterized in the form of a Havriliak-Negami, or HN, material, whose shear modulus is expressed in the following form:

$$\frac{\mu-\mu_\infty}{\mu_0-\mu_\infty}=\frac{1}{[1+(i\omega\tau_{\mathrm{HN}})^{\alpha_{\mathrm{HN}}}]^{\beta_{\mathrm{HN}}}}$$

where $\mu_\infty=\mu|_{\omega=\infty}$, $\tau_{HN}$ is a relaxation time, and $\alpha_{HN}$ and $\beta_{HN}$ are constants, and (h) selecting final material properties of a coating material based on conditions of minimal oscillation amplitudes and maximum energy flux, which is equivalent to the correlation between pressure and velocity fluctuations, $-\overline{p'v'}$, in the range of frequencies corresponding to maximum-energy-carrying disturbances, as well as based on consideration of material fabricability.

13. The method of claim 1, wherein step III thereof includes the following substeps, performed in the order indicated:

(a) solving the equations of motion and continuity for a body with a viscoelastic coating, given the same location and flow conditions as in step I, using a numerical methodology which accounts for non-zero energy flux and surface oscillation boundary conditions, as well as for redistribution of energy between fluctuating components in the near-wall region, and (b) comparing the friction drag calculated for a viscoelastic plate with that calculated for a rigid plate.

14. The method of claim 1, wherein said viscoelastic coating is configured with multiple *surface or* internal structures that approximate the natural longitudinal and transverse wavelengths in the nearwall flow.

15. The method of claim (1), wherein said viscoelastic coating is structured with a rigid underlying wedge or contour shape to minimize coating thickness and oscillations near the intersection of the coating with a rigid surface.

*16. A method for reducing the friction drag of a body by providing a viscoelastic coating, said method comprising the following steps, performed in the order indicated:*

*a) determining characteristics of a turbulent boundary layer at a specified freestream velocity using boundary conditions for a rigid surface of an identical size and shape of the surface to be coated, said characteristics including viscous sublayer thickness, boundary layer thickness, phase speed and frequency corresponding to maximum-energy-carrying disturbances, mean velocity profiles, Reynolds stress distributions, wall shear stress distribution and friction drag;*

*b) selecting material properties of the viscoelastic coating including a density, a complex shear modulus and a coating thickness that, when excited by a forcing function substantially identical to that produced by the turbulent boundary layer as determined in step a), will provide the maximum flux of energy into the viscoelastic coating without producing surface excitation amplitudes that exceed the viscous sublayer thickness;*

*c) determining characteristics of the turbulent boundary layer over the viscoelastic coating and at the specified freestream velocity using oscillation amplitudes and an energy flux corresponding to the material properties of the viscoelastic coating selected in step b), including mean velocity profiles, Reynolds stress distributions, wall shear stress distribution, and friction drag,*

*d) determining a percentage reduction in friction drag as a ratio of the value of the friction drag without the viscoelastic coating as determined in step a) minus the friction drag with the viscoelastic coating as determined in step c) divided by the friction drag without the viscoelastic coating as determined in step a), and thereby quantifying the performance potential of the coating design; and*

*e) composing the viscoelastic coating from a material or a combination of materials as selected in all of the steps a) through d).*

*17. The method according to claim 16, wherein the viscoelastic coating is composed of multiple layers of isotropic, viscoelastic materials with different material properties, where:*

*a) the complex shear modulus, $\mu(\omega)$, is constant within each of the multiple layers,*

*b) boundaries between layers are fixed, and*

*c) the static shear modulus $\mu_0$ of the material is progressively lower for each layer from the top layer to the bottom layer of the viscoelastic coating.*

*18. The method according to claim 16, wherein the coating is composed of an anisotropic material, and the properties of the anisotropic material in the normal direction (y) differ from those in the transverse (x-z) plane.*

*19. The method of claim 16, wherein said viscoelastic coating is structured with a more rigid underlying wedge or a contour shape to decrease the viscoelastic coating thickness and thereby minimize oscillations near the intersection of the viscoelastic coating with a rigid surface.*

*20. The method of claim 16, wherein the viscoelastic coating is combined with surface structures to enhance the stabilization of natural longitudinal and transverse wavelengths in the near-wall flow.*

*21. A viscoelastic coating designed according to the method of claim 16.*

*22. A viscoelastic coating designed according to the method of claim 17.*

*23. A viscoelastic coating designed according to the method of claim 18.*

*24. A viscoelastic coating designed according to the method of claim 19.*

*25. A viscoelastic coating designed according to the method of claim 20.*

* * * * *

UNITED STATES PATENT AND TRADEMARK OFFICE

CERTIFICATE OF CORRECTION

PATENT NO. : RE 41,398 E
APPLICATION NO. : 11/054719
DATED : June 29, 2010
INVENTOR(S) : May et al.

It is certified that error appears in the above-identified patent and that said Letters Patent is hereby corrected as shown below:

Col. 4, line 66, change "velocity, $U_{28}$," to -- velocity, $U_\infty$, --;
Col. 10, line 25, in the equations 28a – 28d, change "$(AC)_t$" to -- $AC_t$ --;
Col. 10, line 64, in Equation 35, change "$R_t2$" to -- $R_t^2$ --;
Col. 11, line 61, change "$\alpha_3$" to -- $\alpha_e$ --;
Col. 14, line 51, Equation 59, change "$I_\omega = p\mu_\Phi{}^2$" to -- $t_\omega = p\mu_*{}^2$ --;
Col. 14, line 52, Equation 60, change "$p_{rms} = K_p I_{(t)} = K_p p\mu_*{}^2$" to
-- $p_{rms} = K_p \tau_\omega = K_p p\mu_*{}^2$ --;
Col. 22, equation at line 14, change "$(AC)_t$" to -- $AC_t$ --;
Col. 22, line 67, change "$\mu_0$" to -- $\mu_*$ --;
Col. 23, line 43, change "$\mu_0$" to -- $\mu_*$ --;
Col. 24, line 67, change "$\mu_0$" to -- $\mu_*$ --;
Col. 25, line 1, change "$\mu_0$" to -- $\mu_*$ --;
Col. 26, line 16, change "$\mu_0$" to -- $\mu_*$ --;
Col. 26, line 67, change "$\mu_0$" to -- $\mu_*$ --; and
Col. 27, line 1, change "$\mu_0$" to -- $\mu_*$ --.

Signed and Sealed this

Twelfth Day of October, 2010

David J. Kappos

David J. Kappos
*Director of the United States Patent and Trademark Office*